United States Patent

Bush

Patent Number: 5,835,879
Date of Patent: Nov. 10, 1998

[54] APPARATUS AND METHOD FOR INDICATING AIRCRAFT FUEL EFFICIENCY

[76] Inventor: Gary L. Bush, 2733 Steamboat Cir., Arlington, Tex. 76006

[21] Appl. No.: 885,934

[22] Filed: Jun. 30, 1997

Related U.S. Application Data

[63] Continuation of Ser. No. 105,504, Aug. 11, 1993, abandoned.

[51] Int. Cl.⁶ .................................. G05D 1/00; G01F 9/00
[52] U.S. Cl. ............................................ 701/123; 701/99
[58] Field of Search .................................. 701/123, 121, 701/99, 3, 4; 73/112, 113, 114

[56] References Cited

U.S. PATENT DOCUMENTS

| | | | |
|---|---|---|---|
| 2,687,612 | 8/1954 | Anderson et al. | 60/39.28 |
| 2,783,940 | 3/1957 | Hartman | 235/61 |
| 2,992,558 | 7/1961 | Newell et al. | 73/178 |
| 3,088,669 | 5/1963 | Sauer et al. | 235/193 |
| 3,153,143 | 10/1964 | Fogarty | 235/184 |
| 3,836,690 | 9/1974 | Purtle, Jr. | 35/10.2 |
| 3,908,451 | 9/1975 | Walker et al. | 364/442 |
| 4,050,295 | 9/1977 | Harvey | 73/114 |
| 4,063,072 | 12/1977 | Sochtig et al. | 364/442 |
| 4,136,389 | 1/1979 | Vogel | 364/442 |
| 4,312,041 | 1/1982 | DeJonge | 364/442 |
| 4,470,296 | 9/1984 | Kobayashi et al. | 73/113 |
| 4,475,380 | 10/1984 | Colovas et al. | 73/114 |
| 4,814,993 | 3/1989 | Zapryanov et al. | 364/442 |
| 5,023,797 | 6/1991 | Lappos et al. | 364/442 |
| 5,574,647 | 11/1996 | Liden | 364/433 |

*Primary Examiner*—Gary Chin
*Attorney, Agent, or Firm*—James E. Bradley

[57] ABSTRACT

An apparatus for indicating fuel efficiency in an aircraft. The apparatus includes a processor having a plurality of inputs, wherein the inputs include a ground speed input for receiving ground speed data signals and a fuel flow input for receiving fuel flow data signals. A display is connected to the processor. Generation means for determining a fuel efficiency number from ground speed data signals and fuel flow data signals is included and a display means is employed to generate a fuel efficiency signal for displaying the fuel efficiency number on the display.

16 Claims, 5 Drawing Sheets

APPARATUS AND METHOD FOR INDICATING AIRCRAFT FUEL EFFICIENCY

This is a continuation of application Ser. No. 08/105,504, filed Aug. 11, 1993, now abandoned.

BACKGROUND OF THE INVENTION

1. Technical Field

The present invention relates in general to aviation instrumentation and in particular to an apparatus and method for indicating aircraft fuel efficiency.

2. Description of the Related Art

The commercial airline industry is an enormous industry. The United States domestic airline industry runs in the billions of dollars per year. Fuels costs are a major factor. The commercial airline industry in the United States consumes over 15 billion gallons of fuel each year. With such large amounts of fuel consumption, small savings in this area can mean the difference between a profitable year and a losing year for many airline companies. As a result fuel economy is an important factor.

Currently, pilots and other flight crew of an aircraft do not know dynamic fuel consumption rates (ground speed per unit of fuel measurement). If information regarding dynamic fuel consumption rates could be provided to them, they could adjust flight conditions to save fuel while staying within other flight parameters. Therefore it would be desirable to have an apparatus and method for indicating fuel efficiency dynamically in an aircraft during flight.

SUMMARY OF THE INVENTION

The present invention provides an apparatus for indicating fuel efficiency in an aircraft. The apparatus includes a processor having a plurality of inputs, wherein the inputs include a ground speed input for receiving ground speed data signals and a fuel flow input for receiving fuel flow data signals. A display is connected to the processor. Generation means for determining a fuel efficiency number from ground speed data signals and fuel flow data signals is included and a display means is employed to generate a fuel efficiency signal for displaying the fuel efficiency number on the display.

Typically, fuel efficiency numbers are not calculated until a selected altitude is reached and the aircraft is in a level course of flight. Additionally, the present invention may average efficiency numbers and display percent changes in fuel efficiency, resulting from changes in aircraft operation. Similarly, a percent change in ground speed could also be displayed for comparison to percent change in fuel economy.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 1:
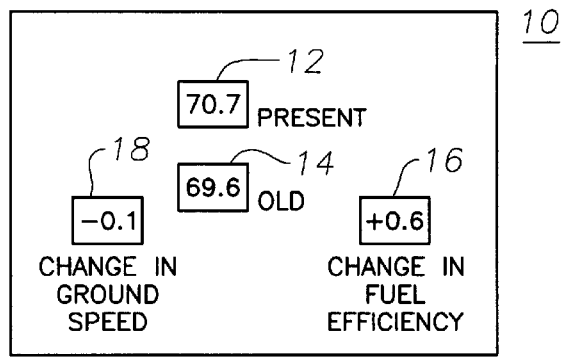
FIG. 1 depicts a diagram of a fuel efficiency instrument in accordance with a preferred embodiment of the present invention.

A fuel efficiency instrument as illustrated in FIG. 1 would provide information useful in increasing fuel economy to the crew of a passenger or cargo aircraft during operation of the aircraft. In the most basic mode, fuel economy instrument 10 is a digital display on a instrument panel and displays a fuel efficiency number, in terms of ground speed per unit of fuel measurement, in a digital form in display 12.

For example, an aircraft travelling at 462 nautical miles per hour and consuming 6.537 thousand pounds of fuel per hour would result in a fuel economy reading of 70.7 as depicted in display 12. Ground speed is employed in calculating fuel economy. Ground speed may be determined in a number of ways known to those of ordinary skill in the art. For example, precise gyros can generate information that may be used in determining ground speed. Ground speed can also be calculated by using navigational fixes or measuring distances from ground based navigational aids. Accuracy of data for ground speed and fuel flow (or fuel consumption) to about three or four significant digits would be useful in providing precise measurements of small changes in fuel economy as a result of various factors, such as flight altitude or flight parameter changes.

In addition to the display of fuel economy in display 12 of fuel efficiency instrument 10 in FIG. 1, a second indicator, display 14, may be provided to present fuel economy from a different flight altitude. Display 16 may be provided to the crew of a passenger aircraft to indicate information as to the percent change in fuel economy between different flight altitudes. Display 18 may be provided to the crew to indicate the percent change in ground speed between different flight altitudes.

Figure 2:
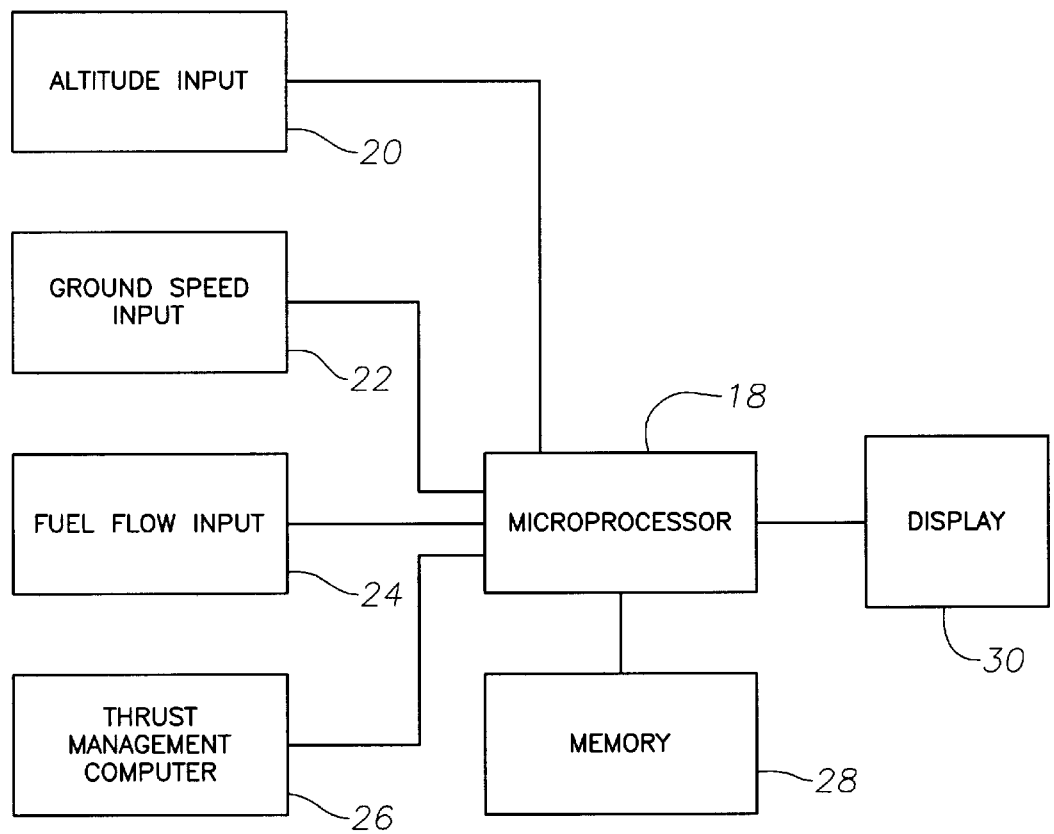
FIG. 2 is a block diagram of the fuel efficiency instrument in FIG. 1.

Referring now to FIG. 2, a block diagram of the fuel efficiency instrument in FIG. 1 is illustrated according to a preferred embodiment of the present invention. Microprocessor 18 in fuel economy instrument 10 receives data from altitude input 20, ground speed input 22, fuel flow input 24, and thrust management computer 26. Whether the aircraft is in level flight may be determined from data supplied by thrust management computer 26. Altitude data may be obtained from instruments known to those of ordinary skill in the art on present day commercial aircraft. The same is true for ground speed and fuel flow data. Thrust management computers also are well known in the art. Microprocessor 18 is connected to memory unit 28, which may be used to store data. Other types of storage devices, such as magnetic media, also may be employed to store data. Microprocessor 18 calculates fuel efficiency and other parameters and displays them to a user on display 30.

Figure 3:
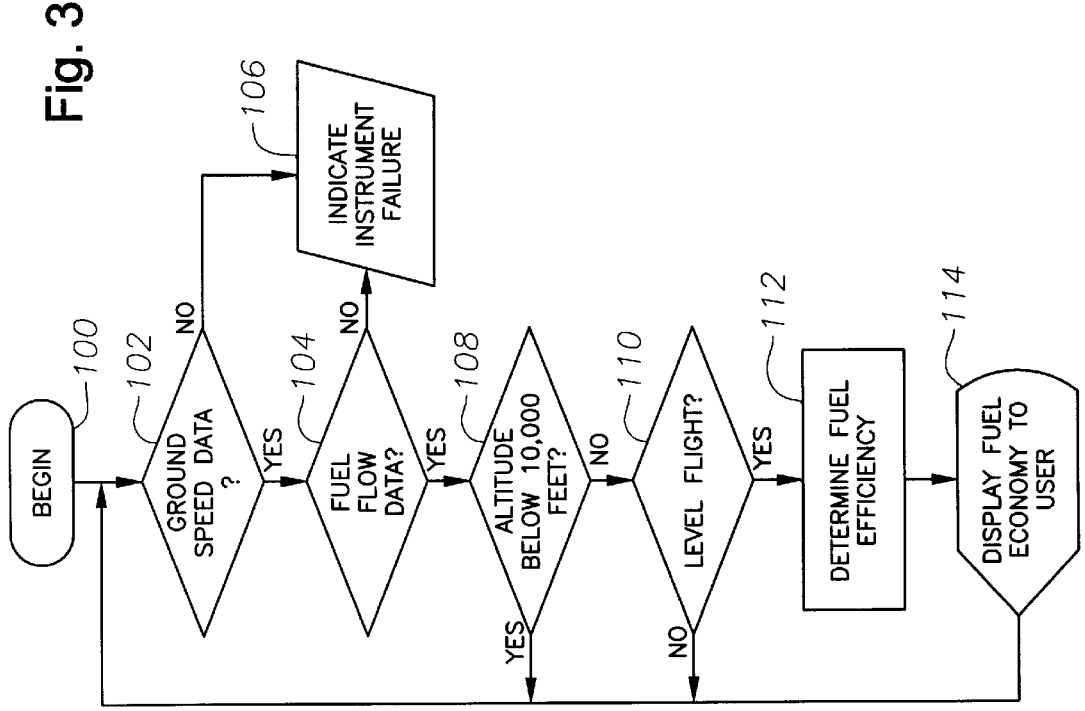
FIG. 3 depicts a flowchart of a process for displaying fuel efficiency to a user on a fuel economy instrument.

With reference now to FIG. 3, a flowchart of a process for displaying fuel efficiency to a user on a fuel efficiency instrument is depicted. The process begins in Block 100 and then searches for the presence of ground speed data (Block 102) and fuel flow data (Block 104). If either input is not present, the user is alerted to an instrument failure (Block 106). Such an indication may be visual or audible. According to the present invention, a determination is made as to whether the aircraft's altitude is below 10,000 feet (Block 108). A determination of whether the aircraft is at a level flight may be made (Block 110). If the altitude is less than 10,000 feet, or the aircraft is not in level flight, fuel efficiency is not calculated. When the altitude is 10,000 feet or greater and the aircraft is level, fuel-efficiency is determined (Block 112) and then displayed to the user (Block 114). Other altitudes other than 10,000 feet may be used to start or initialize the determination of fuel efficiency. Such an altitude may be preprogrammed, hardwired, or entered by a user via an input device such as a numeric keypad.

Fuel efficiency may be calculated by dividing ground speed by fuel consumption. Fuel consumption may be determined from fuel flow rates using methods known to those skilled in the art. Various units and standards of measure may be employed in accordance with a preferred embodiment of the present invention. Block 110 is an optional feature of the present invention. The process then returns to Block 102.

Figure 4:
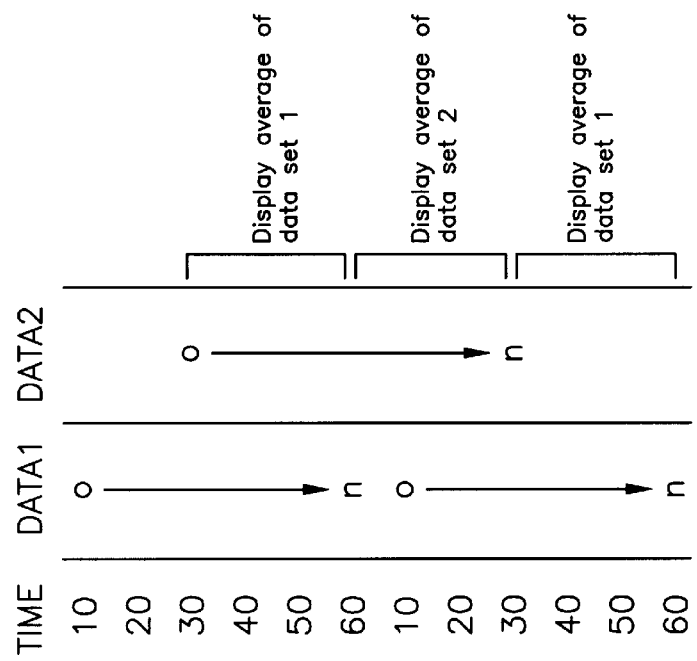
FIG. 4 is a diagram illustrating what averaged fuel efficiency data is displayed.

In some cases may be desirable to average fuel economy numbers for greater accuracy. One method for averaging may be accomplished as shown in FIG. 4. In this example fuel economy numbers are generated every second. A first set of fuel economy numbers, data set 1, are calculated for 30 seconds before being displayed to the user. The fuel economy number displayed after 30 seconds is an average of the first 30 numbers generated. As new fuel economy numbers are generated, they are averaged with previous numbers in data set 1 and displayed to the user. The averaged value is displayed to the user. After the first 30 seconds a second set of fuel economy numbers, data set 2, are calculated and averaged. The average of this second set of numbers is not displayed until 30 seconds has passed. At this time, the average of data set 2 are displayed and the first set of numbers in data set 1 are discarded. A new series of fuel economy numbers are generated and averaged for 30 seconds and then displayed to the user. As a result averages between the first and second sets of numbers are displayed to the user.

Figure 5:
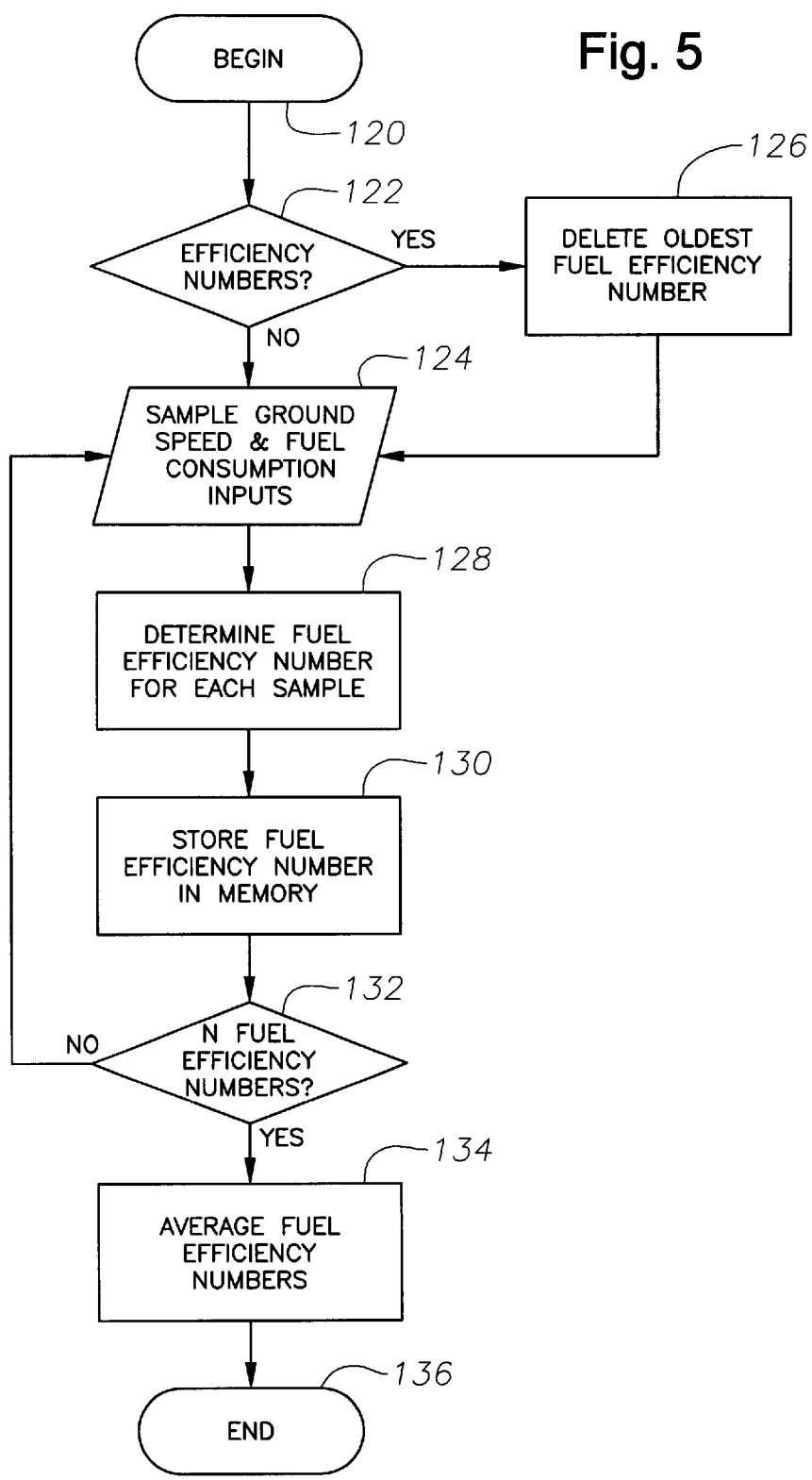
FIG. 5 depicts a flowchart of another process for averaging fuel efficiency numbers according to the present invention.

Referring next to FIG. 5, a flowchart of another process for averaging fuel efficiency numbers according to the present invention is depicted. The process begins in Block 120. A determination of whether data on fuel efficiency, also called efficiency numbers, are present is made (Block 122). If no efficiency numbers are present the ground speed and fuel flow inputs are sampled (Block 124). If efficiency numbers are present, the oldest efficiency number is deleted or discarded (Block 126). An efficiency number is determined from the data sampled from the inputs (Block 128). The calculated efficiency number is stored in memory (Block 130). Afterward, a determination is made as to when n efficiency numbers have been calculated (Block 132). The value n may be any value depending on the desired accuracy. After n efficiency numbers have been calculated, the efficiency numbers are averaged (Block 134) and the process terminates (Block 136). For example, the average displayed may be the running average of the last 30 readings.

Averaging of data is desirable for greater accuracy and to minimize constantly changing flight conditions, such as throttle movement resulting in changes to fuel flow and wind changes resulting in differences in ground speed.

Sometimes a user may desire to see the percent change between different modes of operation during flight, such as altitude changes. For example, for an aircraft is flying at 33,000 feet with a fuel efficiency reading of 65.1. It then climbs to 37,000 feet where a new fuel efficiency reading of 65.4 is obtained. The percent change function would compare the old reading with the new reading and display +0.5, indicating a 0.005 percent increase in fuel efficiency. Additionally, percent changes of fuel efficiency in other modes may be monitored, i.e., percent change in ground speed versus percent change in fuel economy could also be displayed according to the present invention. The new efficiency number is displayed in display 12 in FIG. 1, while the old efficiency number is displayed in display 14. The percent change in fuel efficiency is displayed in display 16.

Figure 6:
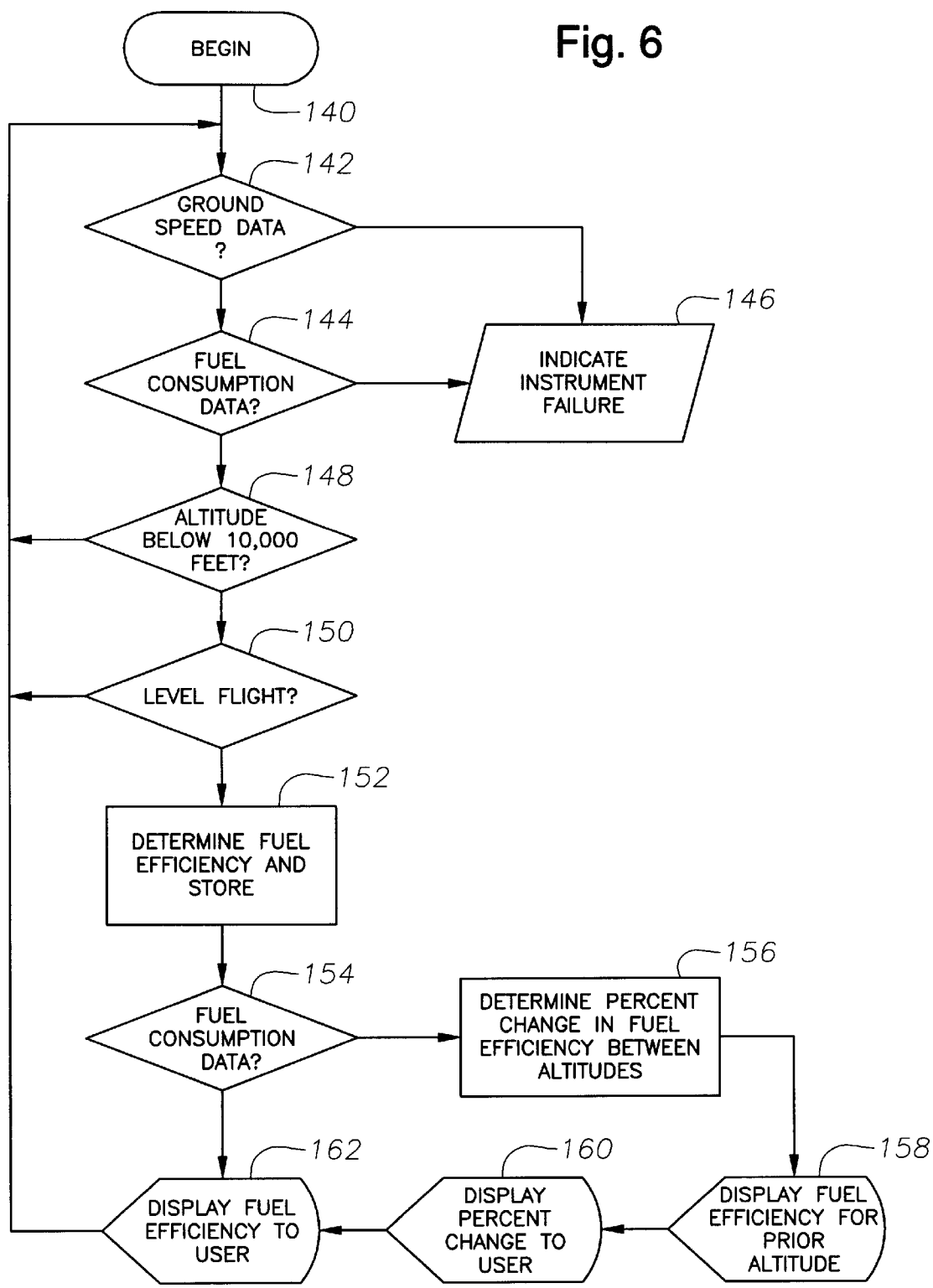
FIG. 6 is a flowchart of a process for displaying fuel efficiency data to a user.

FIG. 6 shows a flowchart of a process for displaying fuel economy data to a user, including a percent change function for different altitudes. The process begins in Block 140 and then a determination of whether ground speed data (Block 142) and fuel flow data (Block 144) are present is made. If both ground speed data and fuel flow data are not available, instrument failure is indicated to the user (Block 146). If both are available, a determination of whether the altitude of the aircraft is below 10,000 feet is made (Block 148). Again as mentioned above, other altitudes may be selected for this step. If the altitude is not below 10,000 feet, a determination of whether the flight of the aircraft is level is performed (Block 150). Whether the flight of the aircraft is level may be determined from data available from a thrust management computer. Also altitude data may be considered in such a determination.

If the aircraft is in level flight, the fuel efficiency of the aircraft is calculated and stored (Block 152). The process then determines whether a change in the flight altitude of the aircraft has occurred (Block 154). If the determination is yes, the process then determines the percent change in fuel efficiency levels for the two different altitudes (Block 156). Optionally in block 156, a percent change in ground speed between the two different altitudes may be calculated. The change in percent of fuel efficiency between the two altitudes or ground speeds may be determined using procedures known to those skilled in the art. The fuel efficiency for the prior altitude is displayed (Block 158) and then the percent change is displayed (Block 160). If a percent change in ground speed is calculated, this change along with the percent change in fuel efficiency is displayed to the user in block 160. Next, the present fuel efficiency is displayed to the user (Block 162). The display of the percent change in fuel efficiency will provide the user an indication of whether the present flight altitude is more desirable than the previous one. The process then returns to Block 142.

Percent changes for other modes of operation such as changes in ground speed also may be determined using the basic flow of the process illustrated in FIG. 6. Block 154 would be changed to determine whether a change in ground speed has occurred, Block 156 would be altered to determine the percent change in fuel efficiency between ground speeds, and Block 158 would be changed to read display fuel efficiency for prior ground speed.

Figure 7:
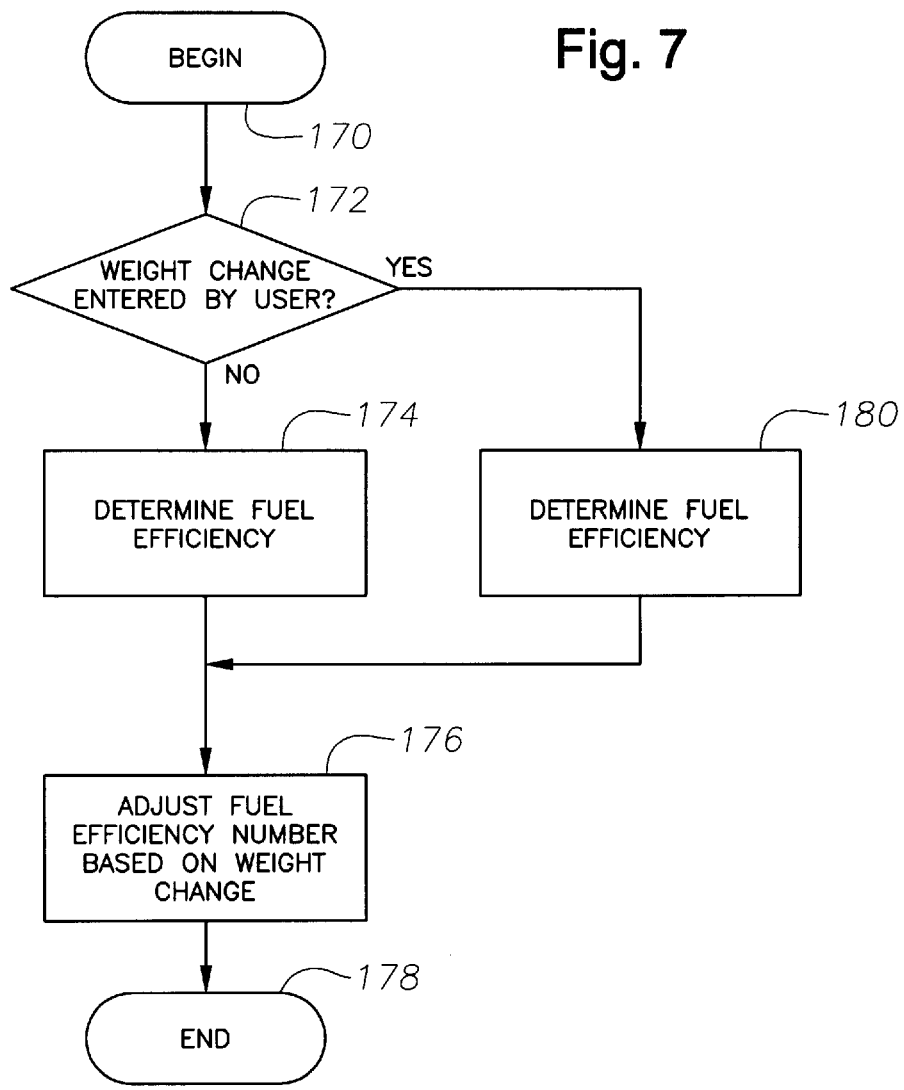
FIG. 7 depicts flowchart of a process for adjusting for weight changes in an aircraft.

Another option for a user of the present invention is to adjust the fuel efficiency calculations for changes in weight, such as the planned weight of the aircraft and the actual weight at take-off. Additionally, it would be desirable in some instances to adjust for changes in weight occurring during stops and during flight. FIG. 7 shows a process that could be implemented in one embodiment of the present invention. The process begins in Block 170 and then a determination of whether a weight change has been entered by the user (Block 172). Changes in weight may be entered via various user input devices, such as a numeric keypad. If a weight change has been entered the fuel efficiency is determined (Block 174) and then adjusted based on the weight change (Block 176). This weight adjustment is a simple normalization procedure to normalize the fuel efficiency number to a standard weight, such as the weight at take-off. The process then terminates in (Block 178). Referring back to Block 172, if no change in weight is made the normal fuel efficiency calculations are performed (Block 180).

For example, an aircraft departing from New York City in route to Los Angeles has a flight plan fuel reading based on an aircraft weight of 200,000 pounds. The flight plan indicates, based on estimated winds, a fuel economy reading of 76.3 over a designated flight plan geographical fix. However, before departing New York City, five passengers less than predicted are on the flight resulting in a new weight of 199,000 pounds as indicated on updated predeparture take-off performance numbers. With all of the parameters except weight being the same, it would be expected that the fuel efficiency indicator according to the present invention would display a fuel economy reading higher than planned because of the lower weight. As a result, a weight adjustment as provided for in FIG. 7 would adjust the display and all other readings through the flight to more closely resemble the flight plan predicted amount. Thus, pilots can tell whether changes in flight altitude or other flight parameters are affecting their fuel efficiency relative to a planned fuel efficiency for the flight.

The present invention provides to a user, such as the pilot or flight crew of an aircraft, fuel efficiency information during flight and allows for decision making, such as changing the altitude of the aircraft, to improve fuel efficiency. For example, a pilot may encounter turbulence at one altitude and change altitude to provide a smooth ride to the passengers at the expense of fuel efficiency. With the present invention, the pilot can see that fuel efficiency has decreased. As a result, the pilot can check at a later time to see if turbulence has diminished at the more favorable altitude.

Although the depicted embodiment is in the form of a digital display on an instrument panel, the present invention may be incorporated into a data processing system, already present on the aircraft, that displays flight information to a user on a video display. The processes of the present invention may be incorporated into such a data processing system to provide an indication of fuel economy automatically or upon selection by the user.

Those of ordinary skill in the art will realize that the processes disclosed could be reasonably implemented in hardware to form the present invention.

While the invention has been particularly shown and described with reference to a preferred embodiment, it will be understood by those skilled in the art that various changes in form and detail may be made therein without departing from the spirit and scope of the invention.

What is claimed is:

1. An apparatus for indicating fuel efficiency in an aircraft comprising:
   ground speed detection means for detecting a ground speed of the aircraft and generating corresponding ground speed data signals;
   fuel flow detection means for detecting fuel consumption by the aircraft and generating corresponding flow data signals;
   generation means for determining a fuel efficiency number from the ground speed data signals and the fuel flow data signals and generating a fuel efficiency signal, the generation means determining the fuel efficiency number for each level portion of a flight;
   memory means for retaining the fuel efficiency numbers for the each level portion of the flight;
   means for calculating a percent change between the fuel efficiency numbers for each two successive level portions of the flight; and
   display means for displaying:
      the fuel efficiency number from the fuel efficiency signal continuously during a firs level flight portion of the flight of the aircraft,
      no number during a transition portion of the flight between the first level flight portion and a second level flight portion, wherein the aircraft changes altitude during the transition portion, and
      the fuel efficiency number from the fuel efficiency signal continuously during the second level flight portion of the flight and the percent change between the fuel efficiency number for the first level flight portion and the fuel efficiency number for the second level flight portion.

2. The apparatus of claim 1 further comprising delay means for preventing the generation means from determining the fuel efficiency number until an altitude greater than a predetermined altitude has been reached by the aircraft.

3. The apparatus of claim 1 further comprising delay means for preventing generation means from determining the fuel efficiency number until the aircraft is travelling at a level course.

4. An apparatus for indicating fuel efficiency in an aircraft comprising:
   a ground speed input for receiving ground speed data signals;
   a fuel flow input for receiving fuel flow data signals;
   generation means for determining a fuel efficiency number from the ground speed data signals and the fuel flow data signals and generating a fuel efficiency signal, wherein the generation means for determining the fuel efficiency number from the ground speed data signals and the fuel flow data signals includes automatically determining a fuel efficiency number after selected period of time;
   a flight altitude input;
   detection means, coupled to the flight altitude input, for detecting when the aircraft has changed from a first altitude to a second altitude; and
   determination means for calculating a percent change in fuel efficiency between first altitude and the second altitude; and
   display means for displaying the percent chance.

5. The apparatus of claim 2, wherein the predetermined altitude is 10,000 feet.

6. A method for indicating fuel efficiency in an aircraft comprising:
   detecting a ground speed of the aircraft and generating corresponding ground speed data signals;
   detecting fuel consumption by the aircraft and generating corresponding fuel flow data signals;
   determining a fuel efficiency number from the ground speed data signals and the fuel flow data signal for each level portion of a flight;
   retaining the fuel efficiency number for at least a preceding level flight portion of the flight;

generating a fuel efficiency signal for display during level portions of a flight;

generating a percent change signal for a change between fuel efficiency numbers for successive level flight portions of the flight;

displaying the fuel efficiency number on a display in response to the fuel efficiency signal continuously during a first level flight portion of the flight of the aircraft;

displaying no number on the display during a transition portion of the flight between the first level flight portion and a second level flight portion, wherein the aircraft changes altitude during the transition portion;

displaying the fuel efficiency number on the display in response to the fuel efficiency signal continuously during the second level flight portion of the flight; and displaying the percent change on the display in response to the percent change signal.

7. The method of claim 6 further comprising delaying the determination of the fuel efficiency number until an altitude greater than a predetermined altitude has been reached by the aircraft.

8. The method of claim 7, wherein the predetermined altitude is 10,000 feet.

9. The method of claim 6 further comprising delaying the determination of the fuel efficiency number until the aircraft is travelling at a level course.

10. A method for indicating fuel efficiency in an aircraft comprising:

receiving ground speed data signals at a ground speed input;

receiving fuel flow data signals a fuel flow input;

determining a fuel efficiency number from the ground speed data signals and the fuel flow data signals, wherein the step of determining the fuel efficiency number from the ground speed data signals and the fuel flow data signals includes automatically determining the fuel efficiency number after a selected period of time;

receiving data signals from a thrust management computer;

detecting when the aircraft has changed from a first altitude to a second altitude from the data signals;

calculating a percent change in fuel efficiency between the first altitude and the second altitude and generating a fuel efficiency signal for display; and displaying the fuel efficiency number on a display in response to the fuel efficiency signal.

11. An apparatus for indicating fuel efficiency in an aircraft comprising:

ground speed detection means detecting a ground speed of the aircraft and generating corresponding ground speed data signals;

fuel flow detection means for detecting fuel consumption by the aircraft and generating corresponding flow data signals;

a processor having a plurality of inputs, wherein the inputs include a ground speed input for receiving the ground speed data signals and a fuel flow input for receiving the fuel flow data signals;

a display connected to the processor;

means executing within the processor for determining a plurality of fuel efficiency numbers from the ground speed data signals and the fuel flow data signals, wherein each of the plurality of fuel efficiency numbers are calculated after a preselected time delay for level portions of a flight; storing a selected number of the fuel efficiency numbers; determining a percent change between successive fuel efficiency numbers; and averaging the fuel efficiency numbers to create an average fuel efficiency number; and means for generating a fuel efficiency signal from the average fuel efficiency number for display on the display continuously during a first level flight portion of a flight of the aircraft; generating no signal for display on the display during a transition portion of the flight between the first level flight portion and a second level flight portion, wherein the aircraft changes altitude during the transition portion; generating the fuel efficiency signal from the average fuel efficiency number for display on the display continuously during the second level flight portion of the flight of the aircraft; and generating a percent change signal from the percent change for the first and second level flight portions for display on the display.

12. An apparatus for indicating fuel efficiency in an aircraft comprising:

a processor having a plurality of inputs, wherein the inputs include a ground speed input for receiving ground speed data signals and a fuel flow input for receiving fuel flow data signals;

a display connected to the processor;

means executing within the processor for determining a plurality of fuel efficiency numbers from ground speed data signals and fuel flow data signals, wherein each of the plurality of fuel efficiency numbers are calculated after a preselected time delay; storing a selected number of the fuel efficiency numbers; and averaging the fuel efficiency numbers to create an average fuel efficiency number;

a thrust management computer for generating data signals;

first processor means for detecting when the aircraft has changed from a first altitude to a second altitude from the data signals;

second processor means for calculating a percent change in the average fuel efficiency number between the first altitude and the second altitude; and means for generating a percent change signal from the average fuel efficiency number for display on the display.

13. An apparatus for indicating fuel efficiency in an aircraft comprising:

a processor having a plurality of inputs, wherein the inputs include a ground speed input for receiving ground speed data signals and a fuel flow input for receiving fuel flow data signals;

a display connected to the processor;

means executing within the processor for determining a plurality of fuel efficiency numbers from the ground speed data signals and the fuel flow data signals, wherein each of the plurality of fuel efficiency numbers are calculated after a preselected time delay; storing a selected number of the fuel efficiency numbers; and averaging the fuel efficiency numbers to create an average fuel efficiency number; and display means generating a fuel efficiency signal from the average fuel efficiency number for display on the display, wherein further comprising:

second processor means for detecting when the aircraft has changed from a first ground speed to a second ground speed from the ground speed data signals and for calculating a percent change in the average fuel efficiency between the first ground speed and the second ground speed.

14. The apparatus of claim 13, further comprising third processor means for calculating a percent change in ground speed between the first altitude and the second altitude; and display means for displaying the percent change in said ground speed.

15. The apparatus of claim 11, wherein the means for averaging the fuel efficiency numbers to create the average fuel efficiency number includes means for averaging the fuel efficiency numbers from the selected number of fuel efficiency numbers most recently calculated.

16. An apparatus for indicating fuel efficiency in an aircraft comprising:

a ground speed input for receiving ground speed data signals;

a fuel flow input for receiving fuel flow data signals;

a flight altitude input for receiving flight altitude data signals;

a thrust management computer input for receiving data signals from a thrust management computer;

generation means for periodically calculating a fuel efficiency number from the ground speed data signals and the fuel flow data signals when the flight altitude data signals indicate that the aircraft is at an altitude greater than a preselected altitude and the data signals from the thrust management computer indicate that the aircraft is in level flight;

detection means for detecting when the aircraft has changed from a first altitude to a second altitude;

determination means, responsive to the detection of the aircraft changing from the first altitude to the second altitude by the detection means, for calculating a percent change in fuel efficiency between the first and the second altitude;

storage means, responsive to detection of a change in altitude of the aircraft greater than a preselected amount, for storing a fuel efficiency number for the first altitude;

display means, responsive to the generation means for displaying the fuel efficiency number and, responsive to the determination means, for displaying the percent change in fuel efficiency.

* * * * *